(12) United States Patent
Parlow et al.

(10) Patent No.: US 11,906,273 B2
(45) Date of Patent: Feb. 20, 2024

(54) ARMOR PLATE, ARMOR PLATE COMPOSITE AND ARMOR

(71) Applicant: Kennametal Inc., Latrobe, PA (US)

(72) Inventors: Werner Parlow, Mannweiler-Cölln (DE); Manfred Wolf, Eckersdorf (DE); Thomas Theuerkauf, Bayreuth (DE)

(73) Assignee: KENNAMETAL INC., Latrobe, PA (US)

( * ) Notice: Subject to any disclaimer, the term of this patent is extended or adjusted under 35 U.S.C. 154(b) by 149 days.

(21) Appl. No.: 17/618,620

(22) PCT Filed: Jun. 10, 2020

(86) PCT No.: PCT/IB2020/055448
§ 371 (c)(1),
(2) Date: Dec. 13, 2021

(87) PCT Pub. No.: WO2020/250147
PCT Pub. Date: Dec. 17, 2020

(65) Prior Publication Data
US 2022/0252377 A1    Aug. 11, 2022

(30) Foreign Application Priority Data
Jun. 13, 2019 (DE) .......................... 102019116153.3

(51) Int. Cl.
*F41H 5/04* (2006.01)
*B32B 7/12* (2006.01)
(Continued)

(52) U.S. Cl.
CPC ............... *F41H 5/045* (2013.01); *B32B 7/12* (2013.01); *B32B 15/043* (2013.01); *C22C 29/02* (2013.01);
(Continued)

(58) Field of Classification Search
CPC ......... F41H 5/045; F41H 5/0457; B32B 7/12; B32B 15/043; B32B 2571/02; C22C 29/02
(Continued)

(56) References Cited

U.S. PATENT DOCUMENTS

| 2,723,214 A | 11/1955 | Meyer |
| 3,395,067 A | 7/1968 | Lane, Jr. |

(Continued)

FOREIGN PATENT DOCUMENTS

| CA | 2282530 A1 | 12/1999 |
| CN | 103180685 A | 6/2013 |

(Continued)

OTHER PUBLICATIONS

Jan. 20, 2022 EPO Notification R161(1) & R.162 EP App. No. 20822360.2 Translation.
(Continued)

*Primary Examiner* — Samir Abdosh
(74) *Attorney, Agent, or Firm* — Larry R. Meenan

(57) ABSTRACT

Armor plate having a thickness of at least 3 mm and an edge length of at least 20 mm, wherein the armor plate (10) consists of a material made largely of a component selected from the group hard metal, cermet and/or combinations thereof. An armor plate composite comprising at least two layers of armor plates and an armor are provided as well.

11 Claims, 5 Drawing Sheets

Figure 1:
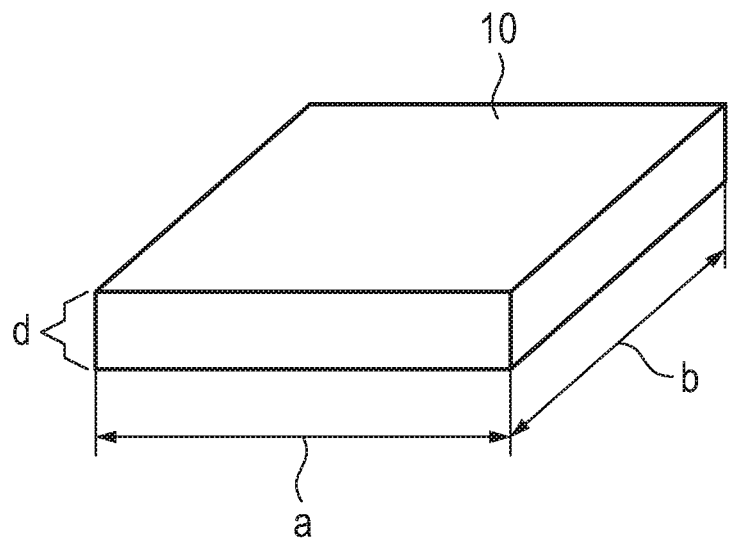

(51) Int. Cl.
*B32B 15/04* (2006.01)
*C22C 29/02* (2006.01)

(52) U.S. Cl.
CPC ........ *F41H 5/0457* (2013.01); *B32B 2571/02* (2013.01)

(58) Field of Classification Search
USPC ........................................................ 89/36.02
See application file for complete search history.

(56) References Cited

U.S. PATENT DOCUMENTS

| | | |
|---|---|---|
| 3,867,239 A | 2/1975 | Alesi et al. |
| 4,824,624 A | 4/1989 | Palicka et al. |
| 4,826,791 A | 5/1989 | Mehrotra et al. |
| 4,969,386 A | 11/1990 | Sandstrom et al. |
| 5,196,252 A | 3/1993 | Harpell |
| 5,227,346 A | 7/1993 | Hwang et al. |
| 5,361,678 A | 11/1994 | Roopchand et al. |
| 5,371,049 A | 12/1994 | Moffett et al. |
| 5,443,917 A | 8/1995 | Tarry |
| 5,648,042 A | 7/1997 | Miller, Jr. |
| 5,686,689 A | 11/1997 | Snedeker et al. |
| 5,760,331 A | 6/1998 | Lowden et al. |
| 5,763,813 A | 6/1998 | Cohen et al. |
| 5,866,839 A | 2/1999 | Ohayon |
| 5,963,776 A | 10/1999 | Lowden et al. |
| 6,009,789 A | 1/2000 | Lyons |
| 6,010,580 A | 1/2000 | Dandliker et al. |
| 6,124,225 A | 9/2000 | Tien et al. |
| 6,135,006 A | 10/2000 | Strasser et al. |
| 6,139,791 A | 10/2000 | Chen et al. |
| 6,149,705 A | 11/2000 | Lowden et al. |
| 6,203,908 B1 | 3/2001 | Cohen |
| 6,248,150 B1 | 6/2001 | Amick |
| 6,314,858 B1 | 11/2001 | Strasser et al. |
| 6,389,594 B1 | 5/2002 | Yavin |
| 6,457,417 B1 | 10/2002 | Beal |
| 6,544,913 B2 | 4/2003 | Kim et al. |
| 6,575,075 B2 | 6/2003 | Cohen |
| 6,601,497 B2 | 8/2003 | Ghiorse et al. |
| 6,693,054 B1 | 2/2004 | Yeckley |
| 6,709,736 B2 | 3/2004 | Gruber et al. |
| 6,749,802 B2 | 6/2004 | Amick |
| 6,793,875 B1 | 9/2004 | Shaw et al. |
| 6,799,518 B1 | 10/2004 | Williams |
| 6,805,034 B1 | 10/2004 | McCormick et al. |
| 6,845,719 B1 | 1/2005 | Spencer |
| 6,912,944 B2 | 7/2005 | Lucuta et al. |
| 6,960,319 B1 | 11/2005 | Kapoor |
| 6,964,933 B2 | 11/2005 | Yeckley |
| 7,049,256 B2 | 5/2006 | Yeckley |
| 7,064,095 B2 | 6/2006 | Mandal et al. |
| 7,069,836 B1 | 7/2006 | Palicka et al. |
| 7,077,048 B1 | 7/2006 | Anderson, Jr. et al. |
| 7,077,306 B2 | 7/2006 | Palicka et al. |
| 7,094,717 B2 | 8/2006 | Yeckley |
| 7,104,177 B1 | 9/2006 | Aghajanian et al. |
| 7,117,780 B2 | 10/2006 | Cohen |
| 7,223,709 B2 | 5/2007 | Yeckley |
| 7,261,036 B2 | 8/2007 | Bourne et al. |
| 7,309,673 B2 | 12/2007 | Yeckley |
| 7,402,541 B2 | 7/2008 | Cohen |
| 7,478,579 B2 | 1/2009 | Carberry et al. |
| 7,514,383 B2 | 4/2009 | Bitterlich et al. |
| 7,562,612 B2 | 7/2009 | Lucuta et al. |
| 7,770,521 B2 | 8/2010 | Williams et al. |
| 7,855,159 B1 | 12/2010 | Yeckley |
| 7,866,248 B2 | 1/2011 | Moore, III et al. |
| 7,886,666 B2 | 2/2011 | Williams et al. |
| 7,992,500 B2 | 8/2011 | Williams |
| 8,281,700 B2 | 10/2012 | Cohen |
| 8,318,622 B2 | 11/2012 | Yeckley |
| 8,367,576 B2 | 2/2013 | Yeckley |
| 9,040,160 B2 | 5/2015 | Carberry et al. |
| 9,228,805 B1 | 1/2016 | Littlestone et al. |
| 9,650,701 B2 | 5/2017 | Parsons |
| 10,234,243 B2 | 3/2019 | Ganor |
| 2002/0012768 A1 | 1/2002 | Cohen |
| 2002/0094406 A1* | 7/2002 | Cohen ................... F41H 5/0421 428/626 |
| 2004/0033883 A1 | 2/2004 | Yeckley |
| 2004/0067838 A1 | 4/2004 | Mandal et al. |
| 2004/0102305 A1 | 5/2004 | Yeckley |
| 2004/0237763 A1 | 12/2004 | Bhatnagar et al. |
| 2005/0189683 A1 | 9/2005 | Yeckley |
| 2006/0027632 A1 | 2/2006 | Akram |
| 2006/0048668 A1 | 3/2006 | Williams |
| 2006/0060077 A1 | 3/2006 | Lucuta et al. |
| 2006/0102276 A1 | 5/2006 | deWitt |
| 2006/0137517 A1 | 6/2006 | Palicka et al. |
| 2006/0144281 A1 | 7/2006 | Williams et al. |
| 2006/0178256 A1 | 8/2006 | Yeckley |
| 2006/0276324 A1 | 12/2006 | Cohen |
| 2006/0288855 A1 | 12/2006 | Cohen |
| 2006/0288897 A1 | 12/2006 | Williams et al. |
| 2009/0301337 A1 | 12/2009 | Wilson et al. |
| 2010/0212486 A1* | 8/2010 | Kurtz .................... F41H 5/0457 89/917 |
| 2010/0288151 A1 | 11/2010 | Williams et al. |
| 2011/0100245 A1 | 5/2011 | Williams et al. |
| 2011/0168049 A1 | 7/2011 | Williams et al. |
| 2011/0266719 A1 | 11/2011 | Shen et al. |
| 2012/0090451 A1* | 4/2012 | Joynt ...................... F41H 5/023 89/917 |
| 2012/0177941 A1 | 7/2012 | Peterson et al. |
| 2012/0291621 A1 | 11/2012 | Sayre et al. |
| 2013/0199360 A1 | 8/2013 | Schaupert et al. |
| 2013/0220107 A1 | 8/2013 | Gettle et al. |
| 2014/0076140 A1 | 3/2014 | Ravid et al. |
| 2017/0299345 A1 | 10/2017 | Waldrop |
| 2019/0017787 A1* | 1/2019 | Arlen ...................... B32B 13/12 |

FOREIGN PATENT DOCUMENTS

| | | |
|---|---|---|
| CN | 108981470 A | 12/2018 |
| DE | 102017116319 | 1/2019 |
| WO | WO9107633 A1 | 5/1991 |
| WO | WO1994027110 A1 | 11/1994 |
| WO | 2008100654 A2 | 8/2008 |
| WO | 2019016750 A1 | 1/2019 |

OTHER PUBLICATIONS

Sep. 29, 2021 Foreign—CN App. No. PCT/IB2018/055380.
Sep. 17, 2020 Notice of Allowance—U.S. Appl. No. 16/631,724.
Jun. 25, 2020 Non-Final OA—U.S. Appl. No. 16/631,724.
Jan. 30, 2020 Search Report IPRP International Publication WO App. No. 2019016750.
Nov. 28, 2018 International Search Report Transmitted.
Dec. 1, 2022 Foreign Office Action United Kingdom Application No. GB2200122.6, 2 pp.
International Search Report and Written Opinion corresponding to PCT/IB2020/055448, dated Oct. 7, 2020, 11 pages.
Evans A.G., et al., "Fracture Toughness Determination by Indentation," Journal American Ceramic Society, vol. 59, No's. 7-8, pp. 371-372.
Extended European Search Report for European Application No. 08754822.8, dated Nov. 28, 2012, 12 Pages.
International Preliminary Report on Patentability for International Application No. PCT/IB2020/055448, dated Dec. 23, 2021, 10 Pages.
International Preliminary Report on Patentability for International Application No. PCT/US2008/050461, dated Jul. 14, 2009, 6 Pages.
International Search Report and Written Opinion for International Application No. PCT/US2008/050461, dated Aug. 27, 2008, 7 Pages.
Mencik Z., et al., "Quantitative Phase Analysis of Synthetic Silicon Nitride by X-Ray Diffraction," Advances in X-Ray Analysis, 1979, vol. 23, pp. 375-379.

(56) References Cited

OTHER PUBLICATIONS

Jun. 27, 2022 Office Action (non-US) CN Application No. 110869693A.
Feb. 11, 2023 Foreign Office Action Chinese Application No. CN202080042218.7, 23 Pages.
Aug. 19, 2011 Non-Final Office Action U.S. Appl. No. 12/416,564, 11 Pages.
Feb. 21, 2012 Notice of Allowance U.S. Appl. No. 12/416,564, 7 Pages.
Nov. 3, 2022 Foreign Office Action Chinese Application No. 2018800454636.6, 14 pages.
Mar. 15, 2022 Office Action (non-US) CN App. No. 110869693A.
May 2, 2023 Foreign Office Action United Kingdom Application No. GB2200122.6, 2 Pages.
Supplementary European Extended Search Report and the European Search Opinion: European Application No. 20822360.2, dated May 23, 2023, 16 Pages.
Aug. 18, 2023 Foreign Office Action Chinese Application No. CN202080042218.7, 14 Pages.

* cited by examiner

ARMOR PLATE, ARMOR PLATE COMPOSITE AND ARMOR

RELATED APPLICATION DATA

The present application is a U.S. National Phase of PCT/IB2020/055448, filed Jun. 10, 2020, which claims priority pursuant to German Patent Application Number 102019116153.3, filed Jun. 13, 2019, each are incorporated herein by reference in their entireties.

The invention relates to an armor plate (so-called add-on armor), an armor plate composite and armor, with which objects, in particular vehicles and mobile units, can be protected against the effects of projectiles, grenades or the like.

A variety of approaches for increasing ballistic resistance are known from the state of the art. Known are, for example, additionally mountable armor plates consisting of ceramic. Armor plates made of a composite material are known as well.

One challenge when designing armors is the need to find a compromise between achievable protective effect, weight and costs. It is generally true that materials with higher weight allow a higher protective effect, but also involve significantly higher costs.

The protective effect of armors can be compared using standardized guidelines. The protection levels for occupants of logistics and light armored vehicles, for example, are regulated in the STANAG (Standardization Agreement) 4569.

Armor plates that consist of a material that contains tungsten heavy metal or tungsten carbide as an essential component are known from DE 10 2017 116 319. It has been shown, however, that the thickness of such armor plates has to be relatively large in order to achieve a sufficiently high protective effect.

The object of the invention is to provide an armor that has the lowest possible weight and the lowest possible production costs, and at the same time is easy to replace if necessary.

The object is achieved according to the invention by an armor plate having a thickness of at least 3 mm and an edge length of at least 20 mm, wherein the armor plate consists of a material made largely of a component selected from the group hard metal, cermet and/or combinations thereof.

Cermets and hard metals are characterized by high hardness and sufficiently high intrinsic weight. As a result, these materials are particularly well-suited for armors that have a very good protective effect and can also be produced at acceptable cost.

One aspect of the invention is based on the realization that cermets, despite their significantly lower density compared to hard metals, are also suitable for the production of armors. By at least partially or completely replacing the hard metal known from the state of the art, the total weight of armor can thus, if necessary, be reduced significantly.

The hard metal can comprise a hard material and a binder, wherein the binder is composed of the elements selected from the group cobalt, nickel, copper, iron and/or mixtures thereof, in particular selected from the group nickel, iron and/or mixtures thereof.

The binder of the hard metal can, aside from unavoidable impurities, accordingly consist only of cobalt, or of a mixture of cobalt, nickel, copper and/or iron or also only of nickel and/or iron.

All hard materials known to the skilled person from the state of the art can be used as a hard material; tungsten carbide in particular can be used.

The selected grain size of the hard material after sintering can be very fine, for example in the range 0.5 to 0.8 μm (corresponding to the classification "fine" according to DIN ISO 4499-2), to coarse, for example in the range of 2.5 to 6.0 μm (corresponding to the classification "coarse" according to DIN ISO 4499-2).

The hard metal can contain other carbides known in the state of the art, for example VC, $Cr_3C_2$, TiC, TaC, NbC, ZrC, HfC and/or mixtures thereof, in particular TiC, TaC, NbC, ZrC and/or mixtures thereof. The properties of the armor plates made of the hard metal can thus be adjusted in a targeted manner; in particular weight reductions can be achieved with at least partial replacement of tungsten carbide in the hard metal.

The hard metal can correspondingly comprise several carbides selected from the group consisting of tungsten carbide, VC, $Cr_3C_2$, TiC, TaC, NbC, ZrC, HfC and/or mixtures thereof, in particular from the group consisting of tungsten carbide, TiC, TaC, NbC, ZrC and/or mixtures thereof.

A further aspect of the invention is therefore based on the fact that a sufficiently stable armor plate can still be obtained if the known tungsten carbide as the hard material is partially replaced by other carbides in the hard metal.

The hard metal can furthermore also contain nitrides known from the state of the art as an additive. Such nitrides can be used to form edge zones. Such an edge zone can have a thickness of 20 to 50 μm.

A multicomponent alloy of the carbides, nitrides and/or carbonitrides of metals known to the skilled person can be used as the hard material of the cermet, for example titanium, zirconium, hafnium, vanadium, niobium, tantalum, chromium, molybdenum, tungsten, aluminum and/or combinations thereof, in particular TiCN.

The binders already discussed for the hard metal can be used as binders in the cermet. The binder can be composed of the elements selected from the group cobalt, nickel, copper, iron and/or mixtures thereof, for example, in particular selected from the group nickel, iron and/or mixtures thereof.

The binder of the cermet can, aside from unavoidable impurities, accordingly consist only of cobalt, or of a mixture of cobalt, nickel, copper and/or iron or also only of nickel and/or iron.

The armor plate preferably has a thickness greater than 3 mm, preferably greater than 5 mm and in particular greater than 10 mm.

The dimensions of a single armor plate are preferably comparatively small. Edge lengths in the range of 20 to 150 mm, in particular in the range of 20 to 50 mm, have proven to be an optimal compromise between good manufacturability on the one hand and a not unmanageable effort when attaching the individual plates on the other hand.

The armor plates can have any geometry that is suitable for completely covering an underlying surface with a plurality of armor plates arranged side by side, apart from joints between the adjacent armor plates.

The plates can in particular have a hexagonal, triangular, square or rectangular shape.

In one design variant, the armor plates have a square shape with an edge length in the order of 50 mm.

According to the invention, an armor plate composite comprising at least two layers of armor plates of the abovementioned type, which are connected to one another, is also provided to achieve the abovementioned object.

The layers of armor plates can comprise armor plates made of different or the same material. In this way, tailor-made armor plate composites can be realized in sandwich construction.

The armor plates of the layers can have the same or different thicknesses, edge lengths and/or cross-sections.

In one embodiment, the individual armor plates of the various layers are mounted congruently one above the other. This allows the armor plate composite as a whole to easily be replaced.

In an alternative embodiment, the armor plates of the layers are offset to one another. This ensures that there are no exposed, continuous joints between the armor plates in armor that is composed of the armor plate composites. This prevents the creation of less stable areas in armor comprising such an armor plate composite.

The individual layers of the armor plate composite can be connected to one another in particular by gluing, sintering, screwing and/or soldering. A silicone-based adhesive can be used as the adhesive. A hard solder should be used as the solder in order to ensure a sufficiently stable connection.

The object is further achieved according to the invention by an armor having a carrier, an armor layer and an adhesive layer, by means of which the armor layer is connected to the carrier, wherein the armor layer comprises a plurality of armor plates, in particular wherein the armor layer is made of armor plates and/or armor plate composites of the aforementioned type.

The armor layer can comprise armor plates and/or armor plate composites made of different materials.

The armor plates which are arranged next to one another and mounted on the carrier can thus be made of the same and/or of different materials.

The plurality of armor plate composites of the armor which are mounted on the carrier can likewise each consist of the same sequence of layers of armor plates, or comprise a different sequence of layers of armor plates made of different materials.

The gap widths of the joints between the armor plates and/or the armor plate composites can be in a range from 0.01 to 0.8 mm. With larger gap widths, the armor does not provide an adequate protective effect. An irregular gap width can also mean that the surface under the armor plates and/or the armor plate composites cannot be completely covered. Smaller gap widths, on the other hand, can only be achieved with much effort.

If necessary, the peripheral surfaces of the armor plates and/or armor plate composites can be smoothed prior to mounting on the carrier in order to compensate for the tolerances of the edge lengths resulting from manufacturing.

The adhesive layer serves as mechanical damping between the armor plates or the armor plate composites and the carrier, which increases the protective effect. At the same time, it is possible to replace the individual armor plates and armor plate composites separately, for example if one of them is damaged after receiving fire.

The adhesive layer is in particular a permanently elastic adhesive layer.

The adhesive layer preferably has a thickness of at least 3 mm and in particular a thickness in the range 3 to 3.5 mm. A thicker adhesive layer increases the ability of the armor to absorb energy when receiving fire. At the same time, however, as little adhesive as possible should be used in order to save costs, and to allow easy replacement of individual armor plates or armor plate composites when necessary.

The adhesive layer can be applied to the carrier as a continuous, flat layer.

According to one embodiment, the adhesive layer has a wavy profile when viewed in section, whereby air is trapped between adjacent wave crests. This increases the elasticity of the adhesive layer. The air can be on the side of the armor plates and/or the armor plate composites. In other words, the adhesive layer is applied to the carrier and the armor plates and/or the armor plate composites are then mounted on the adhesive layer. Such an embodiment can in particular be advantageous when mounting the armor during production, whereas a flat adhesive layer is available as a simple alternative for repairs.

The adhesive of the adhesive layer should ensure sufficient adhesion of the components of the armor attached by means of the adhesive layer in a temperature range from −50° C. to +80° C.

The adhesive layer is preferably a silicone-based adhesive. Said adhesive is characterized by good elasticity with a high adhesive effect and at the same time good resistance to aging while covering a wide temperature range.

The adhesive of the adhesive layer and the adhesive connecting the individual layers of the armor plate composite can be the same or different adhesives. The advantages and considerations regarding the adhesive of the adhesive layer apply analogously to the adhesive connecting the individual layers of the armor plate composite.

Likewise, the thickness of the adhesive layer between the carrier and the armor layer between the individual layers of the armor plate composite can be different or the same.

Alternatively, the adhesive layer can also be realized using a hard solder instead of an adhesive. The armor layer can also be attached to the carrier mechanically.

The carrier preferably consists of a material with which the carrier itself already provides a certain protective effect. The carrier can be composed of a material selected from the group high-strength steel, aluminum, aluminum alloys, titanium, titanium alloys, synthetic fiber composite materials and/or combinations thereof.

Armor steel can in particular be used as the high-strength steel. A suitable synthetic fiber composite material is in particular Kevlar.

In one embodiment, a fragment protection is applied to the side of the armor layer opposite to the adhesive layer. This prevents excessive spalling of the material of the armor layer when receiving fire.

The fragment protection can be glued directly to the armor layer.

The fragment protection can be made of steel, high-strength steel, titanium, titanium alloys, aluminum, aluminum alloys, and/or composite materials. In particular carbon- and/or plastic-based materials can be used as the composite material.

It is also possible to apply additional protection to the side of the carrier opposite to the adhesive layer. This serves to absorb smaller fragments of the carrier and/or the projectile that can occur when the armor receives fire.

In particular foils and/or mats made of in particular carbon- and/or plastic-based composite materials can be used as the additional protection.

The additional protection can likewise be attached to the carrier by gluing or via a mechanical connection.

In another embodiment, the carrier is the outer side of an object provided with the armor, in particular a vehicle or a mobile unit. Here and in the following, mobile unit refers in particular to temporary infrastructure, for example a container.

It is thus possible for armor according to the invention to be attached directly to the outer side of an already existing object, even retroactively. The present invention is thus also suitable for realizing additional armor in a simple manner.

In another embodiment, spacers connecting the carrier to the outer side of the object can be mounted between the carrier and the outer side of the object provided with the armor, in particular a vehicle or a mobile unit.

This makes it possible to also mount the armor according to the invention on objects, the outer surfaces of which do not allow the armor to be mounted directly. The spacing between the carrier and the outer side of the object also provides additional space to intercept smaller fragments of the carrier and/or the projectile so that they cannot damage the outer layer of the object.

Figure 2:
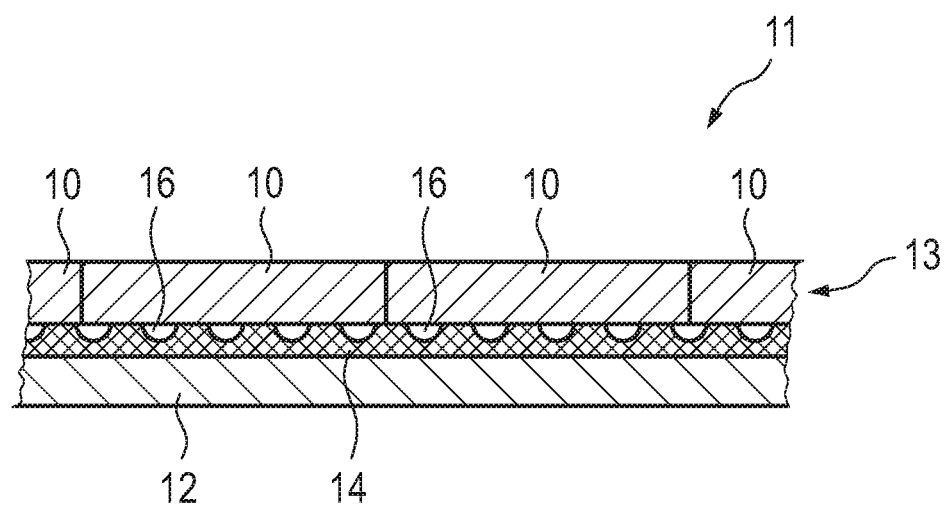
Figure 3A:
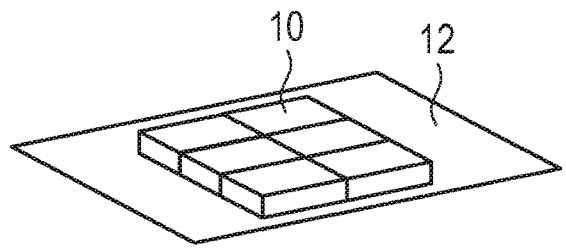
Figure 3B:
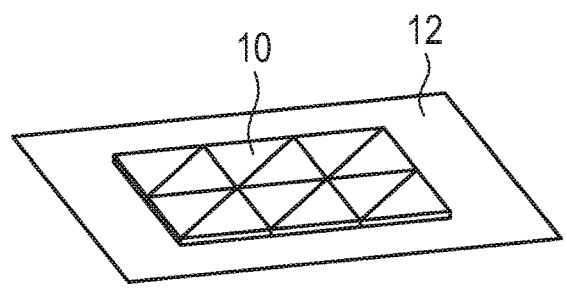
Figure 3C:
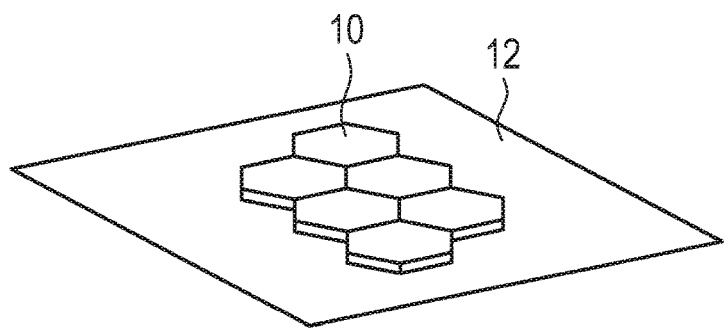
Figure 4:
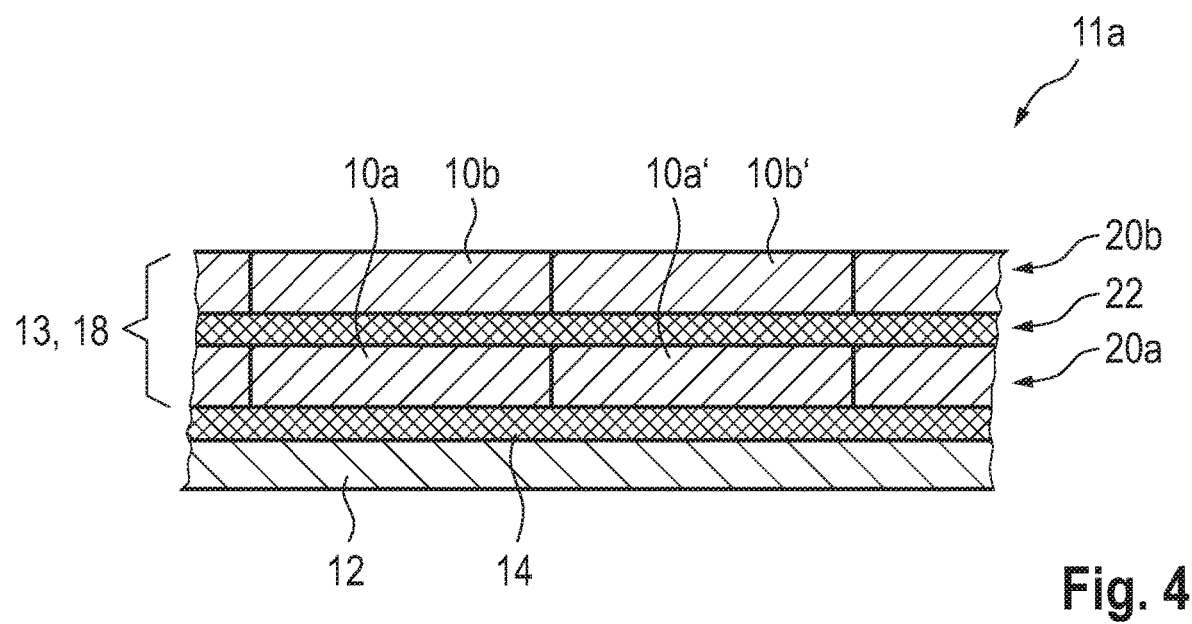
Figure 5:
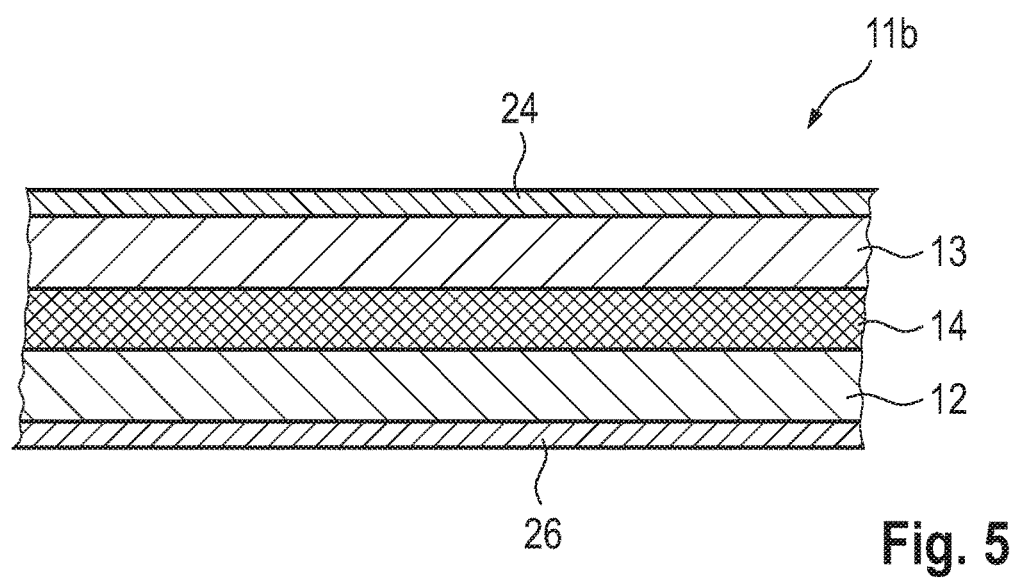
Figure 6:
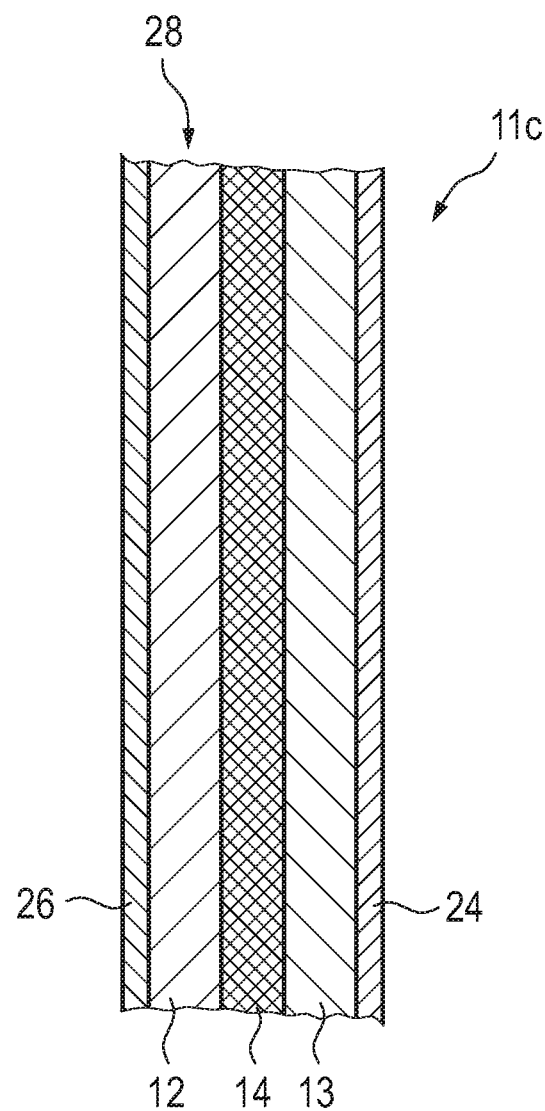
Figure 7:
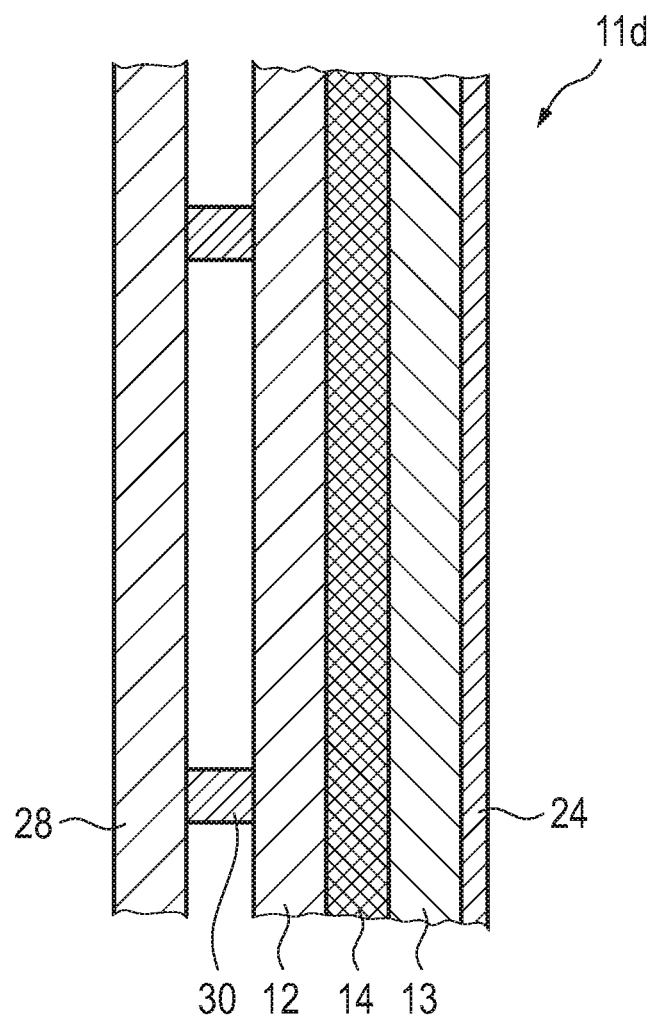

Further advantages and characteristics of the invention will unfold from the following drawings. The figures show:

FIG. 1 an armor plate in a perspective, schematic view;

FIG. 2 armor with a carrier onto which a plurality of armor plates are glued by means of an adhesive layer in cross-section;

FIGS. 3a to 3c perspective views of various geometries of the armor plate;

FIG. 4 armor with a carrier onto which a plurality of armor plate composites are glued by means of an adhesive layer in cross-section;

FIG. 5 an alternative embodiment of an armor with a fragment protection and an additional protection in cross-section;

FIG. 6 a cross-section through a further alternative embodiment of an armor; and FIG. 7 a cross-section through an alternative embodiment with spacers.

The same reference signs are used in all figures for the same components and the corresponding advantages and characteristics listed in relation to one embodiment apply analogously to the components having the same reference sign in different embodiments.

FIG. 1 schematically shows an armor plate 10, which in the design example shown is rectangular and has a constant thickness d.

The thickness d is several millimeters and depends on the desired protective effect. The armor plate preferably has a thickness greater than 3 mm.

The thickness of the armor plate 10 is always selected such that the plate as such is inherently stable and is destroyed only when receiving fire.

The dimensions of the armor plate 10 are relatively small. The edge lengths a, b are in the order of 20 mm to 150 mm and preferably in the range 20 to 50 mm.

The armor plate 10 is a solid part of a material that is largely made of a component selected from the group hard metal, cermet and/or combinations thereof. The usual sintering processes generally known for these materials can be used for production.

FIG. 2 shows the structure of an armor 11 containing a plurality of the armor plates 10 shown in FIG. 1.

The armor 11 shown in FIG. 2 uses a carrier 12 onto which the armor plates 10 are glued adjacent to one another. The armor plates 10 accordingly form an armor layer 13 of the armor 11.

In the shown embodiment, the carrier 12 consists of a steel alloy, in particular a high-strength steel alloy as used in the armoring of vehicles, for example armor steel.

In principle, however, a large number of other materials besides high-strength steel are suitable for the carrier 12, for example aluminum, aluminum alloys, titanium, titanium alloys, synthetic fiber composite materials and/or combinations thereof.

The armor plates 10 are glued to the carrier 12 by means of a first adhesive layer 14. The adhesive forming the first adhesive layer 14 is a silicone-based adhesive.

In principle, it is conceivable to use an adhesive layer with a constant thickness, so that a continuous, flat adhesive layer 14 is applied to the carrier 12.

The embodiment in FIG. 2 shows an alternative form of the adhesive layer 14, in which said adhesive layer has a generally wavy profile when viewed in cross-section. The armor plates 10 are consequently only in contact with the (flattened) wave crests of the first adhesive layer 14. "Channels" 16 are formed between the individual wave crests, each of which is filled with air.

Such an adhesive layer 14 is more complex to produce, however, so that this embodiment is primarily suitable for the initial production of armor 11. On the other hand, if the armor 11 only needs to be repaired, or if the manufacturing process is to be further simplified, a flat adhesive layer 14 can be used as well.

The particular advantage of the armor 11 shown in FIG. 2 is that the individual armor plates 10 can easily be replaced separately if this is necessary. The first adhesive layer 14 ensures mechanical damping between the armor plates 10 and the underlying carrier 12, which increases the protective effect.

In deviation from the rectangular shape of the armor plates 10, in principle any shape can be used that is suitable for completely covering an underlying surface (apart from joints between the adjacent armor plates 10) with a plurality of armor plates arranged side by side. Different geometries of the armor plates 10 are therefore shown in FIGS. 3a to 3c. For example, the armor plates 10 can be square or rectangular (FIG. 1 and FIG. 3a), triangular (FIG. 3b) and hexagonal (FIG. 3c).

The joints between adjacent armor plates 10 should have a width in the range from 0.01 to a maximum of 0.08 mm so as to ensure a sufficiently good protective effect of the armor 11. If necessary, the individual armor plates 10 can be ground to the desired size after the manufacturing process in order to eliminate manufacturing-related tolerances and ensure sufficiently small joints.

FIG. 4 shows a further embodiment of the armor 11a, which comprises an armor plate composite 18.

The armor plate composite 18 is glued to the carrier 12 by means of a first adhesive layer 14. The first adhesive layer 14 is carried out with a constant thickness.

The armor plate composite 18 comprises a plurality of layers 20a and 20b, which are connected to one another by means of a second adhesive layer 22 ("sandwich construction"). In this case, the whole armor plate composite 18 forms the armor layer 13 of the armor 11a.

Each of the layers 20a and 20b comprises a plurality of armor plates 10a and 10b, whereby the material of which the armor plates 10a and 10b are made can differ between the layers 20a and 20b.

The armor plates 10a can be made of a cermet, for example, while the armor plates 10b are made of a hard metal. The armor plates can furthermore also differ within each layer 20a and 20b, so that different armor plates 10a and 10a' or 10b and 10b' are used, for example.

An optimal compromise between the protective effect, the cost and the weight of the armor 11 can thus be made via the selection of the materials of the armor plates 10a and 10b.

In this embodiment, there are overall two layers 20a and 20b made of armor plates 10a and 10b. Even so, the armor plate composite 18 can also consist of more than two layers. It is, however, advantageous to use as few layers as possible to achieve the desired protective effect, and in particular only one layer as shown in FIG. 1, in order to keep the weight of the armor 11 as low as possible.

The possible maximum usable total weight of the armor 11 is usually determined by the object that is to be provided with the armor 11.

Compared to the embodiment shown in FIG. 2, the individual armor plates 10a and 10b can have a smaller thickness, so that the armor plate composite 18 overall has a thickness analogous to the thickness of the armor layer 13 of FIG. 1.

The first adhesive layer 14 and the second adhesive layer 22 can use the same or different adhesives. The second adhesive layer can also have "channels" 16 like the first adhesive layer 14, or a constant thickness as shown in FIG. 4. The second adhesive layer 22 ensures mechanical damping between the armor plates 10a and 10b.

As is the case with the first adhesive layer 14, the layers 20a and 20b can also be connected to one another by means of sintering, screwing or soldering, in particular hard soldering, instead of via the second adhesive layer 22.

In the embodiment shown in FIG. 4, the layers 20a and 20b of the armor plate composite 18 are arranged one above the other such that, viewed in cross-section, the armor plates 10a and 10b of layers 20a and 20b are arranged one above the other, so that the armor plates 10a and 10b lie congruently one above the other, thus also positioning the joints between the armor plates 10a and 10b one above the other. If the joint width is sufficiently small, it has been shown that no impairment of the protective effect of the armor 11a is to be expected in this case either. With such an arrangement, it is particularly easy to replace individual armor plates 10a and 10b as well as entire armor plate composites 18, for example after damage to the armor 11a.

The armor plates 10a and 10b can alternatively also be arranged offset to one another, so that the joints between the individual armor plates 10a and 10b are not positioned exactly one above the other. Even if the protective effect of the armor 11 can theoretically be further increased in this way, in particular with respect to the event of repeated receiving of fire at the same location of the armor 11, the cost of a repair increases in such an embodiment.

Consequently, there has to be a trade-off between manufacturing costs, stability of the armor and the effort in the event of a repair.

FIG. 5 shows a further embodiment of the armor 11b, in which a fragment protection 24 is applied, in particular glued, to the side of the armor layer 13 opposite to the adhesive layer 14.

The armor layer 13 can be constructed of individual armor plates 10 or armor plate composites 18 as in the embodiments shown above.

The fragment protection 24 is, for example, made of steel, high-strength steel, titanium, titanium alloys, aluminum, aluminum alloys, composite materials in particular carbon- and/or plastic-based, and/or combinations thereof.

The fragment protection 24 generally has a smaller thickness than the armor layer 13.

If a projectile hits the armor 11b, for example, the armor plates 10 of the armor layer 13 will fragment as a result of the impact. The fragment protection 24 ensures that these fragments cannot spall off the surface of the armor 11b to any significant degree. It has been shown that this can further increase the stability of the armor layer 13 as a whole and thus the protective effect of the armor 11b.

The armor 11b shown in FIG. 5 further comprises an additional protection 26 on the side of the carrier 12 opposite to the adhesive layer 14. The additional protection 26 is in particular glued and/or mechanically attached to the carrier.

In particular foils and/or mats made of in particular carbon- and/or plastic-based composite materials can be used as the additional protection.

The additional protection 26 serves to absorb smaller fragments of the carrier 12 and/or the projectile that can occur when the armor receives fire.

FIG. 6 shows a further embodiment of the armor 11c, which comprises the fragment protection 24 and the additional protection 26 analogous to FIG. 5. In the embodiment shown in FIG. 6, however, the carrier 12 is the outer side 28 of an object provided with the armor 11, so that part of the object itself is also part of the armor 11c.

The object is a vehicle or a mobile unit, for example. Mobile unit here refers in particular to temporary infrastructure, for example a container.

An already existing protective effect of the object, for example the armored outer layer of a vehicle, can thus be exploited and its protective effect merely supplemented by the additional components of the armor 11c. A retrofitting of already existing objects with the armor 11 is thus easily possible as well.

The additional protection 26 is in particular advantageous in an embodiment according to FIG. 6, for example when an occupant of an armored vehicle is positioned directly behind the carrier 12. Even if the projectile that hits the armor 11c when receiving fire, for example, cannot penetrate said armor, fragments could spall off the carrier 12 in the direction of the occupant and injure him. This is effectively prevented by the additional protection 26.

Since the armor layer 13 and the carrier 12 absorb most of the force of the impact, the parts of the carrier 12 that spall off in the direction of the occupant hardly have any penetrating power, so that a thin foil and/or mat is sufficient as the additional protection 26.

FIG. 7 shows a further embodiment of the armor 11d, wherein the armor 11d is attached to the outer side 28 of an object with the aid of spacers 30, in particular on the outer side of a vehicle or a mobile unit.

Such an embodiment is suitable in particular when the carrier 12, the armor layer 13 and/or the adhesive layer 14 cannot be attached directly to the outer side 28 or the outer side 28 itself is not made of a sufficiently stable material, so that an embodiment according to FIG. 6 cannot be realized.

The spacers 30 additionally ensure that fragments or spellings of the carrier 12, for example, do not strike the outer side 28 directly when the armor 11d receives fire. Accordingly, no additional protection 26 is provided in the embodiment according to FIG. 7.

The spacers 30 also make it easy to replace the armor 11d in the event of damage, because the armor only has to be detached from the spacers 30 and new armor 11d mounted at the damaged location.

The invention claimed is:

1. Armor plate having a thickness of at least 3 mm and an edge length of at least 20 mm, wherein the armor plate consists of a material made largely of
    a cermet or a combination of a cermet and a hard metal,
        wherein the cermet comprises a hard material and a binder, wherein:
    the hard material of the cermet is TiCN, and the binder of the cermet is composed of elements selected from the group cobalt, nickel, copper, iron or mixtures thereof.

2. Armor plate according to claim 1, wherein the armor plate consists of a material made largely of a combination of a hard metal and a cermet, wherein the hard metal comprises a hard material and a binder,
wherein the binder of the hard metal is composed of elements selected from the group cobalt, nickel, copper, iron or mixtures thereof.

3. Armor plate according to claim 2, wherein the hard material of the hard metal comprises several carbides selected from the group consisting of tungsten carbide, VC, CnC2, TiC, TaC, NbC, ZrC, HfC or mixtures thereof.

4. Armor plate according to claim 1, wherein the edge length of the armor plate is in the range 20 to 150 mm.

5. A plate composite comprising at least two armor plates according to claim 1, which are connected to one another.

6. The armor plate of claim 2, wherein the binder of the hard metal is composed of elements selected from the group nickel, iron or mixtures thereof.

7. The armor plate of claim 3, wherein the hard material of the hard metal comprises several carbides selected from the group consisting of tungsten carbide, TiC, TaC, NbC, ZrC or mixtures thereof.

8. The armor plate of claim 1, wherein the binder of the cermet is composed of elements selected from the group nickel, iron or mixtures thereof.

9. The armor plate of claim 4, wherein the edge length of the armor plate is in the range of 20 to 50 mm.

10. The armor plate of claim 1, wherein the material forms an outermost surface of the armor plate.

11. The armor plate of claim 1, wherein the armor plate is monolithic.

\* \* \* \* \*